United States Patent [19]

Cox

[11] 4,048,879
[45] Sept. 20, 1977

[54] STOCK SENSING DEVICE

[75] Inventor: Joseph Henry Cox, Cincinnati, Ohio

[73] Assignee: Cincinnati Milacron Inc., Cincinnati, Ohio

[21] Appl. No.: 741,206

[22] Filed: Nov. 12, 1976

[51] Int. Cl.² .................. B23B 19/00; B23B 13/02
[52] U.S. Cl. .................................. 82/28 R; 82/2.5;
200/61.41; 214/1.1; 408/7
[58] Field of Search ............... 82/2.5, 2.7, 28, 40;
408/7; 200/61.41, 61.58 R; 214/1.1, 1.4

[56] References Cited

U.S. PATENT DOCUMENTS

| 2,625,061 | 1/1953 | Mansfield | 408/7 |
| 3,703,112 | 11/1972 | Selby | 82/2.5 |
| 3,823,628 | 7/1974 | Fortune | 82/2.7 |

*Primary Examiner*—Leonidas Vlachos
*Attorney, Agent, or Firm*—James D. Liles

[57] ABSTRACT

An apparatus utilizes fluid pressure measurements to sense sufficient chucking stock for a chuck with work gripping surfaces. A flexible seal cooperates with a workpiece at a location proximal to the chuck jaws to restrict flow of a pressurized fluid. Flow resistance varies at this location with the presence or absence of sufficient chucking stock. A pressure switch senses the resulting fluid backpressure which varies with the resistance of the flow path and generates a signal indicative of the presence or absence of sufficient chucking stock which is used to control functions of a machine tool.

9 Claims, 8 Drawing Figures

STOCK SENSING DEVICE

BACKGROUND OF THE INVENTION

This invention relates to workholding chucks as used on automatic turning machines. Automatic turning machines generally utilize long bars for work feed stock which extend through the spindle of the head stock of the machine out of the front of the spindle and though a work holding chuck. As a workpiece is finish-machined and cut off from the parent bar stock, the grip of the workholding chuck can be relaxed and the bar is fed outward to present new material for machining. Many types of bar feeder attachments are used to increment stock through the work spindle. There are pushers which urge the workstock forward from the rear of the headstock and there are pull type attachments which grab a part and withdraw it from the front of the chuck. It is with this latter type of attachment that the present invention can be used most advantageously.

After withdrawing additional stock through the chuck for the next successive machine operation the chuck reclamps on the workstock. At this time, it is imperative that there be sufficient clamping stock present within the clamping area. If this condition is not met and there is not sufficient clamping stock present in the clamping area, a real and active danger exists, in that as the workpiece is rotated and a cutting tool is engaged against the workpiece, it may be "cammed" out of the clamping position due to forces generated by the cutting action. Additionally, in the absence of sufficient clamping stock, the chuck may not be operating at its proper design forces and may tend to have overstressed points which could operate to the detriment of the chuck assembly and cause failure of the components. For example, if a jaw type chuck is used for clamping the work stock and there is not sufficient stock to cover the clamping face of the jaws, high unit stresses will be developed over the zone of the clamp and high bending stresses may be developed in the jaw bodies as well. Since the jaws are normally subjected to great stresses because of the fly-away tendencies of centrifugal action, the internal stresses are compounded and may cause failure of the jaws.

Most prior art devices for sensing the presence of stock to allow adequate clamping have also included cumbersome mechanical devices which reach through the headstock spindle and touch the end of the workpiece. These devices, however, are impractical to use and function. Similarly, stock feelers have been contained within a chuck body which necessitates having a complex chuck unit and feedback sensing control. Many of these disadvantages have been alleviated by the stock sensing device disclosed in applicant's U.S. Pat. No. 3,982,085. The present invention, likewise, alleviates many of these prior art problems with further elimination of mechanical features and increased simplicity. It provides an alternative method of stock sensing with additional cost savings.

SUMMARY OF THE INVENTION

The invention relates to a stock sensing device which, in the preferred embodiment, is used to sense sufficient chucking stock for a chuck with workgripping members. The apparatus utilizes a source of pressurized fluid which is directed into a receiving channel for a workpiece. A seal around the channel yieldably engages the periphery of the workpiece and cooperates with the workpiece to restrict fluid flow from the channel. This flow restriction creates a backpressure, the magnitude of which is indicative of the presence or absence of the workpieces at the seal location. A signal, corresponding to the presence or absence of a workpiece at the seal, is generated when the backpressure exceeds a predetermined level and is used to control functions of the machined tool.

DESCRIPTION OF THE PREFERRED EMBODIMENT

Figure 1:
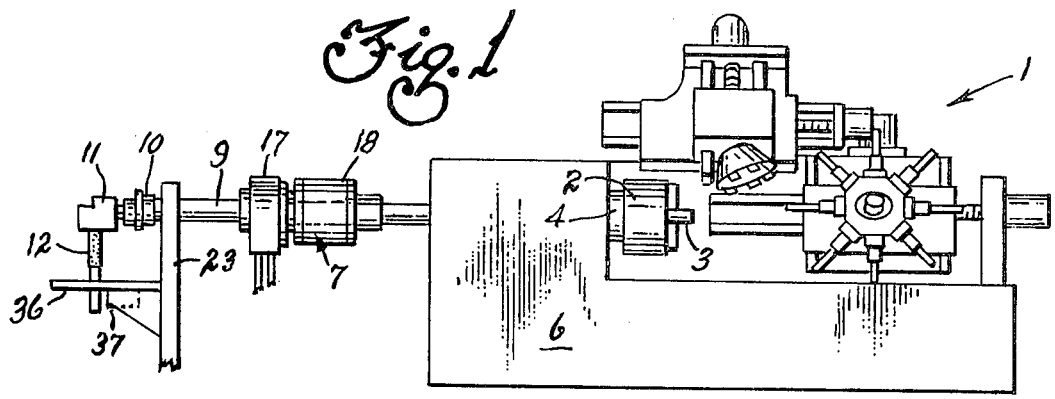
FIG. 1 is a front elevational view of a turning machine utilizing a form of the present invention.
Figure 2:
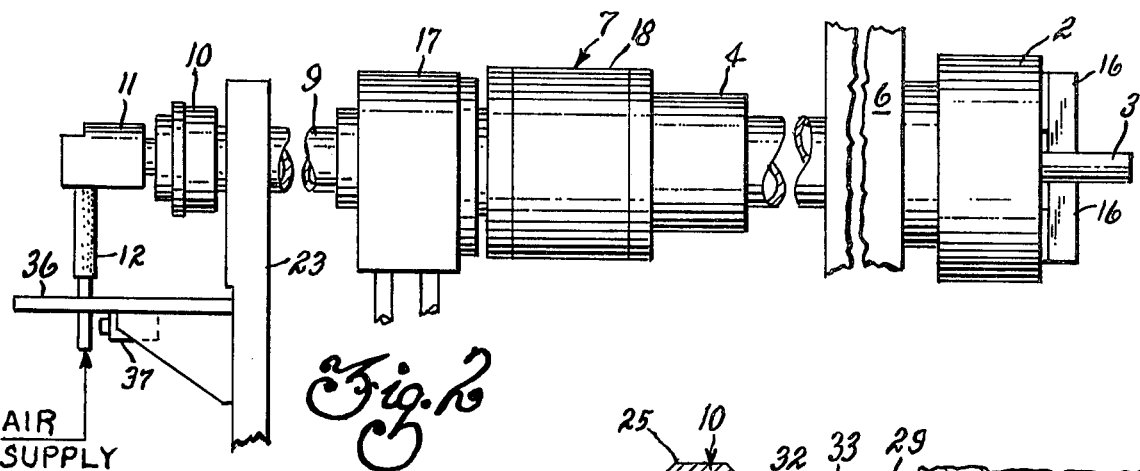
FIG. 2 is a front elevational view of the turning machine of FIG. 1 with the housing removed for clarity of illustration.

Referring to the drawings and to FIGS. 1 and 2 in particular, a turning machine 1 having a rotating workholding chuck 2 is shown holding a workpiece 3. The chuck 2 is mounted to a face of a spindle 4 for rotation therewith. A draw tube 5 (shown in cross-section views of FIGS. 5 and 6) extends from the chuck 2 and beyond the housing 6 within the spindle 4. The draw tube 5 terminates in a rotating hydraulic cylinder 7 where it is axially moved by a piston 8 (FIG. 4) contained within the cylinder 7. An extension 9 from the cylinder 7 is capped by a quick disconnect coupling 10 which is connected to a rotary union 11. A fluid supply pipe 12 is joined in fluid communication with rotary union 11 and supplies a pressurized fluid, preferably air, to a channel 13 extending from the end of extension 9 through coupling 10, hydraulic cylinder 7, draw bar 5, and chuck 2 to the ambient atmosphere. A plastic liner 14 (FIGS. 3-5) lines substantially all of channel 13 and extends from the chuck 2 to the coupling 10.

Figure 4:
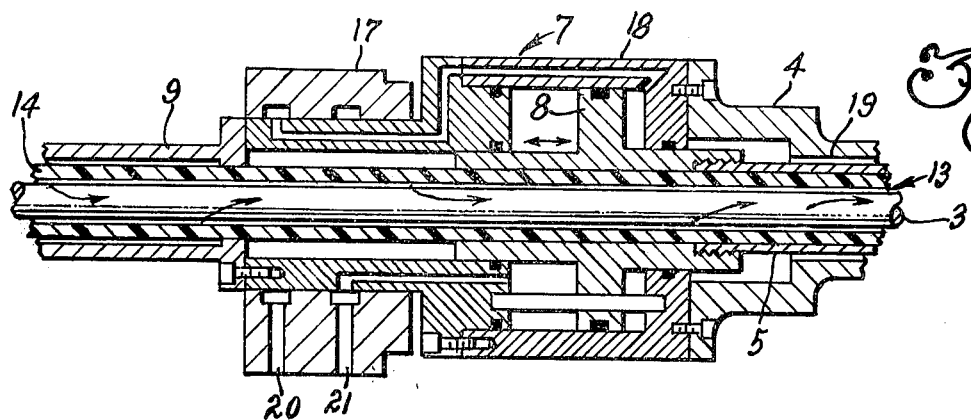
FIG. 4 is a cross-sectional view of the hydraulic cylinder utilized in FIGS. 1 and 2, with details emitted for clarity.
Figure 5:
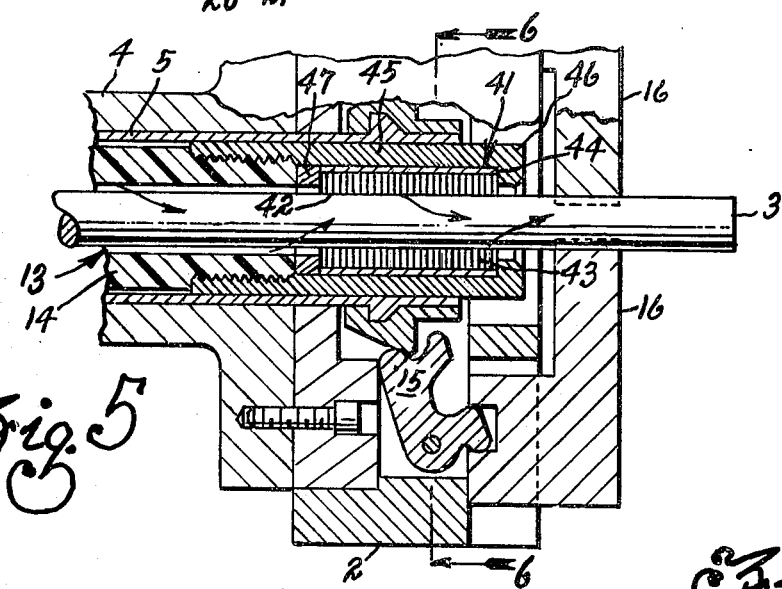
FIG. 5 is an elevational view, partially cut away and partially in cross-section illustrating the positioning of a flexible brush seal positioned proximally to the chuck jaws.

As shown most clearly in FIGS. 4 and 5, the draw tube 5 transmits a linear force to several pivoted levers 15 in the chuck 2 which convert the linear force to a radial force for radial movement of a plurality jaw slides 16, in unison, to grip the workpiece 3. This linear force is imparted to the draw tube 5 by the conventional rotating hydraulic cylinder 7.

Figure 3:
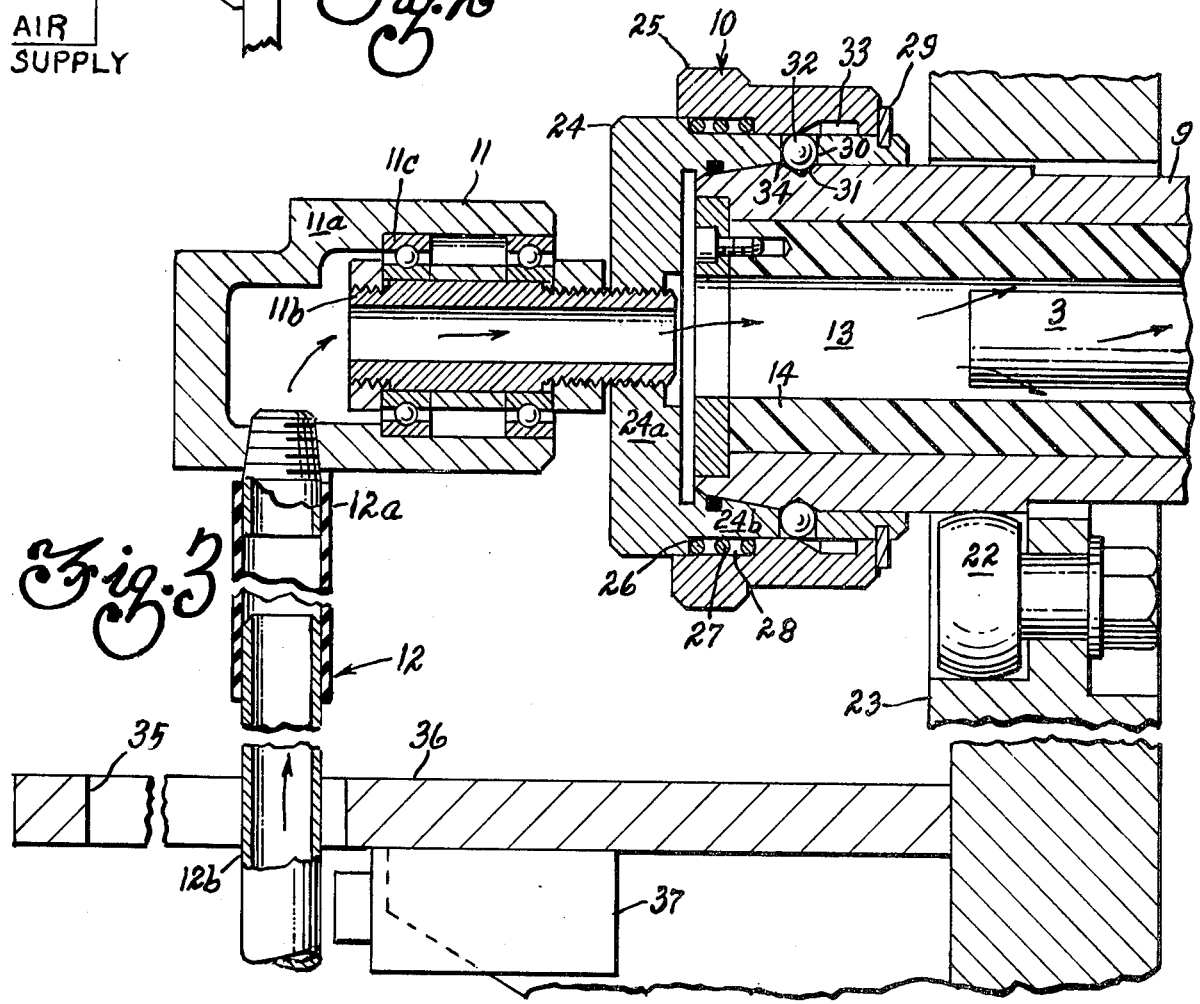
FIG. 3 is a front elevational view, partially in cross-section, of the rotary union and quick disconnect coupling utilized in the embodiment of FIG. 1.

The hydraulic cylinder 7 (FIG. 4) is of conventional design and composed of two sections, a stationary section or stator 17 and a rotating section or rotor 18. An internal bore 19 extends through the spindle 4, stator 17 and the rotor 18 and receives the draw tube 5 within the rotor 18 where it is threadably connected to the piston 8. The piston 8 is axially movable about the periphery of plastic liner 14 within the rotor 18 in accordance with hydraulic pressure communicated to the piston surfaces through ports 20 and 21 contained in the stator 17 and defines a portion of the bore 19. Extending from the stator 17 is a rotor extension 9 which is supported by a plurality of cam rollers 22 (only one of which is shown in FIG. 3) which are in turn supported by an outboard support assembly 23. The rotor extension 9 terminates beyond the support assembly 23 and is capped on its end by a quick disconnect coupling 10 and rotary union 11.

As shown most clearly in FIG. 3, quick disconnect coupling 10 is designed to facilitate quick and convenient capping and uncapping of the rotor extension 9. The coupling 10 has a body 24 circumscribed by a collar 25. The body 24 has an enlarged end portion 24a with an outside diameter of predetermined dimension and a reduced outside pilot diameter on its inner portion 24b adjacent the outboard support assembly 23. The enlarged diameter about portion 24a, adjacent the rotary union 11, forms a shoulder 26 which is abutted by a compression spring 27 circumscribing the pilot diameter of the inner portion 24b of the body 24. The collar 25 in turn circumscribes the spring 27 and the pilot diameter 24b, the former being contained within a relief portion 28 in the collar 25. The collar 25 is axially slidable upon the body 24. This axial movement is limited in the inward direction, toward the support assembly 23, by a retaining ring 29 mounted on the body 24 and in the outward direction by the shoulder 26 formed by the end portion 24a of the body 24. The collar 25 is biased inwardly toward the retaining ring 29 by the compressive force of spring 27 which abuts the shoulder 26 formed at the edge of relief portion 28. The pilot diameter of the body 24 also has a series of tapered holes 30 which align with an annular locking groove 31 on the periphery of the stator extension 9. When the coupling 10 is in its locked capped position a ball 32 fitted into each of the holes 30 extends into the annular locking groove 31. The diameter of the balls 32 and the holes 30 are matched such that the clearance provided by the end of tapered hole 30 adjacent the stator extension 9 is less than the diameter of ball 32 but large enough to permit a spherical sector of the spherical ball 32 to extend into the annular locking groove 31 on the periphery of stator extension 10. The balls 32 are retained in the holes 30 by the collar 25. An annular relief groove 33 formed in collar 25 is positioned such that axial movement of the collar 25 upon the body 24 against the force of spring 27 aligns the groove 33 with the series of holes 30 to permit the balls 32 to clear the corner 34 of the annular locking groove 31. Axial movement between the body 24 and the stator extension 9 is then possible and the entire quick disconnect coupling 10 may be removed to uncap the stator extension 10.

Figure 7:
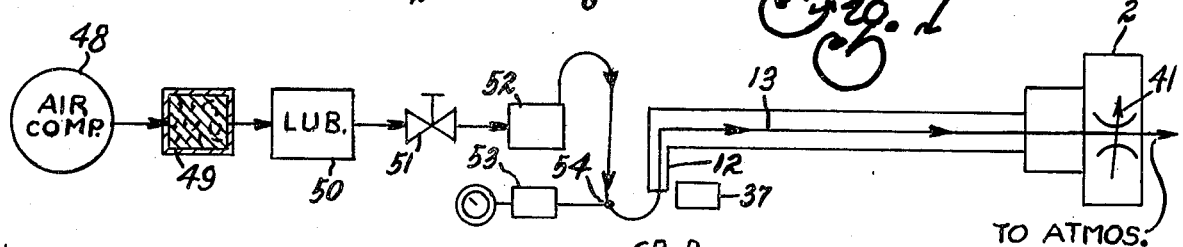
FIG. 7 is a diagramatic illustration of a pneumatic circuit which might be employed on the embodiment of FIG. 1.

The rotary union 11 joins the rotating body 24 of quick disconnect coupling 10 to the nonrotating fluid supply pipe 12. The union 11 has a fixed body portion 11a and a rotor 11b supported by the bearings 11c within the body 11a. The rotor 11b extends to the coupling 10 where it is threadably received by the body 24a. The supply pipe 12 is threadably connected to the body 11a of rotary union 11 on its upper end portion 12a and extends through a slot 35 within a block 36 secured to the outboard support assembly 23 by suitable means, e.g., screws. The supply pipe 12 has at least two and preferably three distinct sections. The upper end portion 12a is formed with a non-metallic material such as plastic while the adjacent section 12b is formed of a metallic material. A proximity switch 37, attached to the side of block 36, is thus activated by the proximal positioning of supply pipe portion 12b but not by portion 12a. Consequently, proximity switch 37 will not be activated when quick disconnect coupling 10 is in its uncapped condition and rotary union 11 is rested upon block 36. A signal resulting from activation of the proximity switch, however, is suggestive of the proper capped positioning of coupling 10. The remaining portions of pipe 12 beyond section 12b is preferably constructed of flexible hosing in order to accomodate the movement of rigid portions 12a and 12b. It should also be apparent that rigid portions 12a and 12b, which extend through slot 35 in block 36 may additionally serve as an anti-rotation bracket for the body 11a of rotary union 11. Also secured to the outboard support assembly 23 is an electrical porting valve 52 (FIG. 7). The valve 52 provides a means for automatically controlling the flow of pressurized air prior to entry into fluid supply pipe 12.

Figure 6:
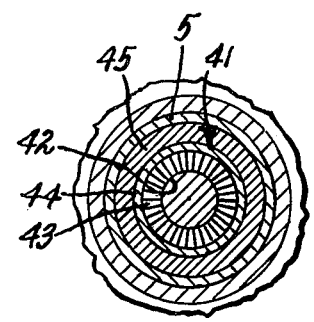
FIG. 6 is a fragmentary sectional view in the direction of line 6—6 in FIG. 5 illustrating the flexible brush seal of the preferred embodiment.

Referring now to FIGS. 5 and 6, a fibrous brush bushing 41, having an internal bore 42, is circumferentially positioned in the channel 13 and fitted within the chuck 2. A forest of closely spaced bristles 43 is embedded in a cylindrical brush base 44 and extends radially inward toward the axial center of the channel 13. The brush base 44 is fitted within an adapter 45 which is threadably connected to the plastic liner 14. A shoulder 46 is formed at one end of the adapter 45 to prevent axial movement of the brush base 44 in a direction toward the chuck jaws 16. The opposite end of brush base 44 is abutted by a disc spacer 47 which prevents axial movement of the brush 41 in a direction away from the jaws 16. The internal bore 42 of bushing 41 forms a portion of the channel 13 and has a cross-sectional shape adapted to circumscribe the workpiece 3. The bristles 43 are flexible and readily conform to the surface contours of a wide range of workpiece shapes. The brush 41 fits closely around the workpiece 3 and cooperates therewith to restrict the flow of air from the channel 13. A tortuous labyrinth flow path around the workpiece 3 is thus provided through the forest of individual bristles 43. However, whenever the brush 41 interfaces the workpiece for any substantial distance, wide variances in the fluid backpressure will result between the conditions of workpiece presence and absence. The use of a brush 41 is particularly well suited for workpieces of rough and irregular surfaces, as for example hot rolled steel, as it will readily adapt to irregular surfaces and still resist rupture and tearing from rough scales on the surface.

In operation, the pressurized fluid such as compressed air is directed into fluid supply pipe 12. The air then flows through the rotary union 11, capped quick disconnect coupling 10, stator extension 9, rotating hydraulic cylinder 7 and draw tube 5. The flow of fluid from the draw tube 5 to the ambient atmosphere is through one of two alternate paths. If the channel 13 through the center of brush 41 is vacant, fluid flow will pass freely through this channel 13 to the atmosphere. If, however, the portion of channel 13 through brush 41 is occupied by a workpiece 3 the brush 41 would then surround the workpiece and force the flow through the forest of fibers of brush 41. Due to the variance in flow resistance between the two alternate paths, the backpressure of the air adjacent brush 41 may be utilized to detect the presence of work stock at this location. The brush 41 is preferably in close proximity to the work gripping members 16 of the chuck 2 in order that a minimum remnant will result. It is possible, however, to locate the brush 41 a greater distance from this critical location with increased remnant. Alternatively, if the machine 1 is operated by a computer numerical control system a counter may be utilized to signal the number of permissible incremental workstock advances to insure sufficient chucking stock with known incremental advances and brush location distances.

A pneumatic circuit for the stock sensing device of the present invention is shown diagramatically in FIG. 7. A compressor 48 provides a source of pressurized air which is passed through a filter and dryer 49, a lubricator 50 and pressure regulator 51. An automatic porting valve 52 controls and the air flow adjacent the pressure regulator 51. If the valve 52 is in the open position, the air flows into the supply pipe 12 and through the channel 13 to the location of brush 41. The backpressure is sensed at location 54 with an in-line pressure switch 53. This pressure reading is then used to generate a signal, indicative of the absence or pressure of stock, at location 54 and used to control function of the turning machine 1.

Figure 8:
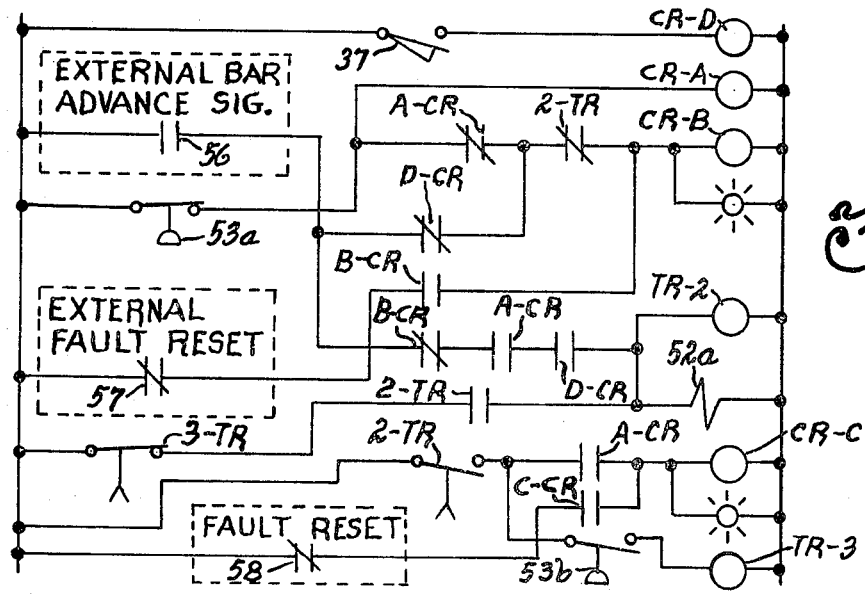
FIG. 8 is a diagramatic illustration of a control circuit which might be employed for controlling the stock sensing device of FIG. 1.

The diagrammatic illustration of FIG. 8 shows a control circuit which might be used for the turning machine 1 and the pneumatic circuit of FIG. 7. An external signal generated from the bar feeder pulling attachment, or more typically from a numerical control tape program, closes contacts 56 and indicates that bar stock has been advanced. This is a command signal that the test for sufficient chucking stock should occur. At this time, the normally closed pressure switch 53a should be closed and coil CR-A energized, as the air supply through air supply valve 52 has not yet been activated. If, however, the pressure switch 53a is open, signalling a deflective or improperly installed switch, the coil CR-A will not be activated. This latter condition permits current to flow through normally closed contacts A-CR and 2-TR for energization of coil CR-B and an indicating light signalling a fault or defect in the pressure switch 53a. This condition prevents further sequencing and remains locked in the system until reset externally by a push botton (not shown) associated with normally closed reset contacts 57. This fault condition may also result from a failure to position proximity switch 37 properly in a similar manner, i.e., the closure of contacts D-CR through the non-activation of coil CR-D.

If pressure switch 53a is closed, coil CR-A will be activated. This activation, coupled with the activation of coil CR-D, achieved by approximating the closed capped position of coupling 10, permits energization of timer TR-2 so long as no fault signal flows through coil CR-B. This condition permits sensing system to operate activates the air supply by energizing solenoid 52a contained with valve 52. After a small time delay set by timer TR-2 to allow for backpressure to be built up, timed switch 2-TR is closed and the pressure switch 53a is examined once again.

Whenever the length of stock is insufficient to restrict air flow through brush 41 to maintain a predetermined backpressure, coil CR-A will remain activated and coil CR-C will be activated, along with its associated indication light signalling the absence of sufficient chucking stock. This condition is also locked into the circuit until reset by an external push button associated with normally closed reset contacts 58. When the backpressure does exceed this predetermined level, contacts A-CR, in series with coil CR-C, are opened and current is diverted to timer TR-3 through pressure switch 53b, the latter switch closing at this same predetermined level of backpressure. After a preset time delay in timer TR-3, time switch 3-TR is opened deactivating solenoid 52a and resetting timer TR-2. Additionally, an output signal through timer TR-3 is sent to the external source holding contacts 56 and thus removes the command signal for activation of the sensing device until subsequent advancement of the stock.

What is claimed is:

1. In a machine tool, an apparatus for sensing the presence of a workpiece, comprising:
 a channel adapted to receive a workpiece at one end;
 means for directing a pressurized fluid into said channel;
 a seal around said channel, said seal adapted to yieldably engage the periphery of a workpiece extending through the channel and cooperating therewith to restrict fluid flow from the channel whereby a backpressure is maintained in the channel;
 means for sensing the backpressure in the channel and operable to produce a workpiece present signal when the backpressure exceeds a predetermined level; and
 means responsive to the workpiece present signal for controlling functions of the machine tool.

2. An apparatus as recited in claim 1, wherein said seal is a flexible labyrinth member adapted to conform to surface contours of a workpiece forcibly inserted therethrough.

3. An apparatus as recited in claim 2, wherein said flexible labyrinth seal is capable of conforming to the surface contours of a predetermined range of workpiece shapes.

4. An apparatus as recited in claim 3, wherein said seal is a brush circumferentially positioned in the channel and having closely spaced bristles extending radially inward toward the axial center of the channel, said brush extending for a substantial distance along the channel.

5. An apparatus as recited in claim 4, wherein said pressurized fluid is directed in said channel in a direction parallel to a direction of workpiece feed.

6. An apparatus as recited in claim 5, wherein said pressurized fluid enters said channel through a stock loading orifice positioned in an end portion of said channel.

7. An apparatus as recited in claim 6, further comprising a quick disconnect coupling upon the end portion of said channel, said pressurized fluid directing means directing the fluid through the quick disconnect coupling.

8. In a machine tool, having a chuck with work gripping members for holding a workpiece being machined, an apparatus for sensing sufficient chuck stock, comprising:
 a channel adapted to receive a workpiece at one end, said channel extending into the chuck;
 means for directing pressurized air into said chuck;
 a flexible bush circumferentially positioned in the channel and having closely spaced bristles extending radially inward toward the axial center of the channel, said brush extending for a substantial distance along the channel and being adapted to conform. to surface contours of a predetermined range of workpiece shapes;

a quick disconnect coupling attached to the receiving end of said channel;

means for sensing the backpressure in the channel and operable to produce workpiece present signal when the backpressure exceeds a predetermined level; and means responsive to the workpiece signal for controlling functions of the machine tool.

9. In a machine tool, having a chuck with work gripping members for holding a workpiece being machined, an apparatus for sensing sufficient chuck stock, comprising:

a channel adapted to receive a workpiece at one end, said channel extending into the chuck;

means for directing a pressurized fluid into said channel;

a plurality of flow passages for said pressurized fluid, said passages being proximally located to said chuck and having unequal flow resistances including at least one flow passage through a labyrinth bushing adapted to encompass a workpiece and a flow passage through said workpiece channel;

means for sensing the backpressure in the channel and operable to produce a workpiece present signal when the backpressure exceeds a predetermined level; and means responsive to the workpiece present signal for controlling functions of the machine tool.

* * * * *